Aug. 5, 1969 A. H. BOBECK 3,460,104

MAGNETIC DOMAIN PROPAGATION DEVICE

Filed Aug. 25, 1965 3 Sheets-Sheet 1

INVENTOR
A. H. BOBECK
BY Herbert M. Shapiro
ATTORNEY 3,460,104
MAGNETIC DOMAIN PROPAGATION DEVICE
Andrew H. Bobeck, Chatham, N.J., assignor to Bell Telephone Laboratories, Incorporated, New York, N.Y., a corporation of New York
Filed Aug. 25, 1965, Ser. No. 482,463
Int. Cl. G11b 5/02
U.S. Cl. 340—174 8 Claims

ABSTRACT OF THE DISCLOSURE

A simplified domain wall propagation mechanism is described. A uniform bias field propagates domain walls in a magnetic medium. Wall motion is inhibited at prescribed positions in the medium by a superimposed second field generated in a pattern to reduce the bias field to zero at the prescribed positions. When the second field is interrupted, inhibited walls escape to next adjacent inhibit positions.

This invention relates to information storage devices and, more particularly, to such devices wherein information is propagated therethrough in the form of magnetic flux patterns.

One such device, commonly known as a domain wall device, comprises, typically, a ferromagnetic material having a re-entrant hysteresis characteristic. The magnetic material is initialized magnetically in a first direction and a field, generated therein, in excess of a nucleation threshold characteristic of the material reverses a portion of the material to a second direction. This reversed portion, commonly termed a reverse domain, defines domain walls at its boundary with the remaining material. Normally, these domain walls and reverse domains therebetween are propagated through the material, typically in the form of magnetic wire, to a remote sense conductor in response to a polyphase propagation field in excess of a propogation threshold but smaller than the nucleation threshold. The propagation field is provided by applying pulses alternatively to overlapping first and second drive solenoids crisscrossing the magnetic wire, as is well known.

A more simple propagation expedient is to provide a uniform field along the entire magnetic wire. This is usually implemented by applying a D.C. bias to a conductor wrapped about the magnetic wire. Unfortunately, uniformity of characteristics over a practical length of such magnetic material is not presently realizable. Consequently, in response to a uniform propagating field applied to the material, the progress of a domain wall through the material is far from uniform. Not only does the domain wall traverse equal lengths of the material in unequal times, but also the transit times through the material for successive domain walls vary for a given applied field. Moreover, the progress of a domain wall through the wire is sensitive to stray fields. In addition, adjacent domain walls propagate in opposite directions in response to a uniform field of a given polarity. Thus, the more simple propagation expedient is impractical.

It is an object of this invention to provide a new and novel domain wall device wherein the progress of a domain wall therethrough in response to a uniform field is essentially uniform.

It is a further object of this invention to provide a new and novel domain wall device substantially immune to stray fields.

A still further object of this invention in accordance with one aspect thereof is to provide a new and novel domain wall shift register in which adjacent domain walls are propagated in a like direction.

The foregoing and further objects and features of this invention are realized in one embodiment thereof wherein a magnetic wire of a material having re-entrant hysteresis characteristics is wrapped by a first conductor to which a D.C. pulse is applied to generate a propagation field for propagating a domain wall established therein. A second conductor is positioned in such a manner that loops therein intersect the magnetic wire at designated spaced apart positions therealong. In response to a current flowing in the second conductor, opposing fields are generated in adjacent portions of the wire at those designated positions. The domain wall advances one position under the influence of the field generated by the current in the first conductor each time current applied to the second conductor is removed. As a result, the domain wall "escapes" from successive ones of a sequence of positions along the wire at prescribed times regardless of material variations and stray fields. Moreover, the domain wall traverses the entire wire in a time corresponding to a prescribed number of pulses.

In accordance with another aspect of this invention adjacent domain walls are propagated in a like direction in response to a single pulse applied to a single conductor coupled to the magnetic wire. Specifically, a conductor is coupled to the magnetic wire such that the sense of the coupling reverses at designated positions along the wire. Conductive elements positioned at those designated positions, via eddy current effects, "unlatch" domain walls there in response to each alternation in a bias applied to the conductor.

Accordingly, a feature of this invention is an elongated magnetic medium including means for generating a uniform field in said medium and a conductor coupled to said medium for generating oppositely poled fields in adjacent portions of the medium at spaced apart positions therealong for reducing the uniform field to zero there.

Another feature of this invention is a magnetic medium and means for generating oppositely poled fields in adjacent portions of that medium along with means for providing transient positional change in the zero (field) point between adjacent portions in response to reversals in field polarities there.

The foregoing and further objects and features of this invention will be understood more fully from a consideration of the following detailed description rendered in conjunction with the accompanying drawing wherein.

Figure 1:
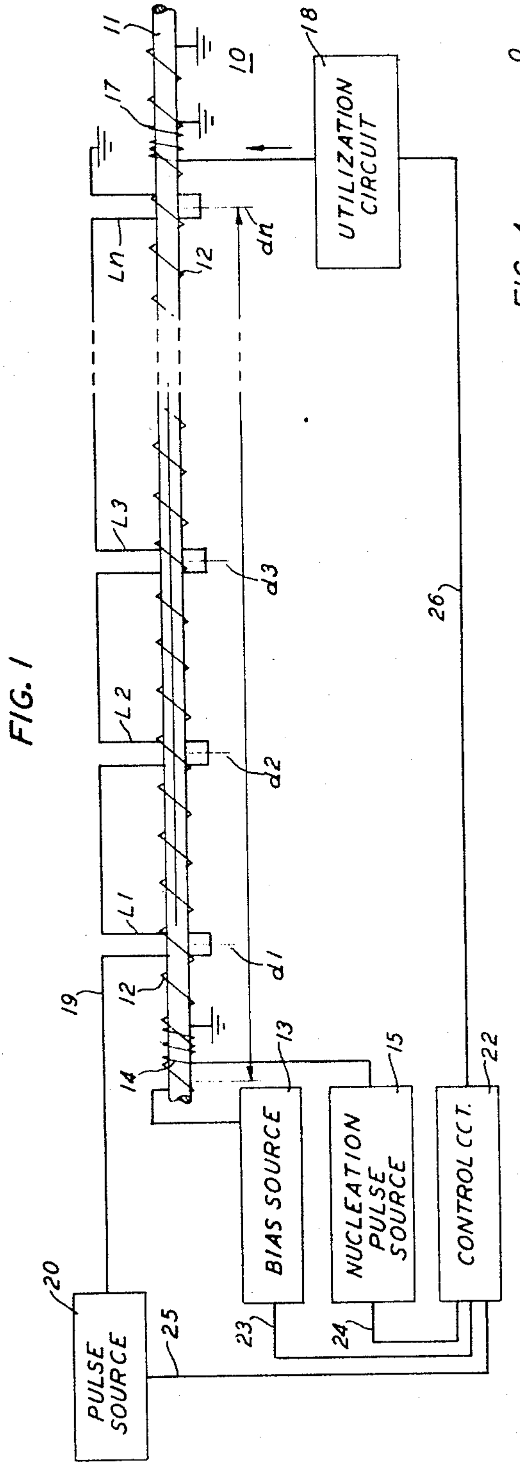
FIG. 1 is a schematic illustration of a magnetic domain wall device in accordance with this invention.

FIG. 1 shows a domain wall device 10 in accordance with this invention. The device comprises a magnetic (reentrant) medium 11 shown as a magnetic wire, illustratively, about which a bias conductor 12 is wrapped. Conductor 12 is connected between a bias source 13 and ground. A nucleation conductor 14, coupling one end of wire 11, is connected between a nucleation pulse source 15 and ground. A sense conductor 17 couples wire 11 at a position remote from that coupled by conductor 14, typically the remote end of the wire 11. Conductor 17 is connected between a utilization circuit 18 and ground. A pulse conductor 19 having loops L1, L2, L3, . . . L*n* therein is coupled to wire 11 at spaced apart positions therealong. Specifically, each loop in conductor 19 couples a corresponding position of wire 11. Conductor 19 is connected between a pulse source 20 and ground. The sources 13, 15, 20 and the utilization circuit 18 are connected to a control circuit 22 by conductors 23, 24, 25, and 26, respectively. The various pulse sources and the utilization circuit may be any such elements operable in accordance with this invention.

The operation of the device shown in FIG. 1 depends to a large extent on the effect of the magnetic field generated about conductor 19 in response to currents flowing therein. Accordingly, a few words about those fields and the effect thereof are in order at this juncture as a basis for understanding the operation of that device.

Figure 2:
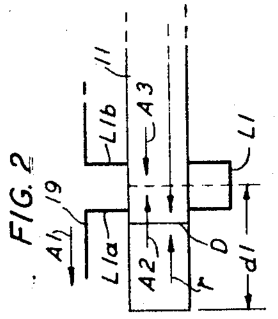
Figure 3:
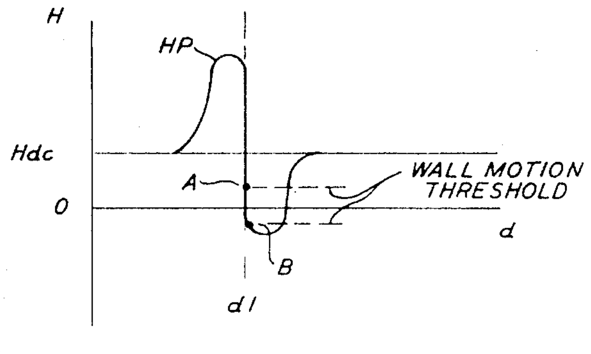
FIG. 3 is a graph of the fields generated in the portion of the device shown in FIGS. 2 and 5 during operation.

FIG. 2 shows a portion of conductor 19 including loop L1. Consider the magnetic field generated in wire 11 in the vicinity of loop L1 when a current flows, in conductor 19, in a direction toward pulse source 20. A current in such a direction is conventionally considered negative and is indicated herein by an arrow, A1, directed toward the source. The field generated in wire 11 by the current flowing in portion L1*a* of loop L1 is directed to the right. The field generated in wire 11 by the current flowing in portion L1*b* of loop L1 is directed to the left. These directions are indicated by arrows A2 and A3. If the distance between the left end of wire 11, as viewed in FIG. 1, and the mean position of the portion of wire 11 coupled by loop L1 is designated *d*1, then a current flowing in a conductor 19 may be considered to generate opposing fields at position *d*1 in the wire. Since any current flowing in conductor 19 flows through all loops therein, like opposing fields are generated in corresponding positions of the medium 11. Those positions are similarly designated *d*2, *d*3, . . . *dn* in FIG. 1. The field configuration at each of those positions is shown as curve H*p* in FIG. 3 illustratively for position *d*1. This curve indicates an accelerating field to the left of the broken vertical line corresponding to position *d*1 and a decelerating field and a reversing field to the right of that position. The figure is discussed further hereinafter.

Figure 5:
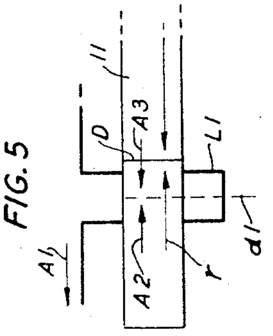
FIGS. 2 and 5 are schematic illustrations of a portion of the device of FIG. 1.

In operation of the device shown in FIG. 1 then, nucleation pulse source 15 is activated under the control of control circuit 22 to nucleate a stable reverse (magnetized) domain in the portion of wire 11 coupled thereby. The forward direction for flux is represented by a leftward directed arrow as shown in FIG. 1 in wire 11, and a reverse domain is represented by an arrow *r* directed to the right as shown in FIGS. 2 and 5. Bias source 13, under the control of control circuit 22, applies a pulse to conductor 12 for generating a uniform field, represented as a horizontal line designated H*dc* in FIG. 3, in wire 11 before, after, or during the nucleation of the reverse domain. This uniform field functions to expand the reverse domain to the right as viewed in FIG. 1. In other words, the domain wall D, shown in FIG. 2, moves, illustratively, to the right under the influence of a D.C. field. Under the influence of this same field the remaining domain wall (not shown) moves to the left off the magnetic wire. Simultaneously, pulse source 20 initiates a current in conductor 19, under the control of control circuit 22 generating a field H*p* at each loop therein. The domain wall D moves to position *d*1 and stops because the fields H*dc* and H*p* (FIG. 3) superimpose to provide, at the designated positions along the wire, a field less than that necessary for domain wall motion in either direction. The wall motion threshold is indicated in FIG. 3 as points A and B on horizontal broken lines for motion to the right and left along the medium, respectively. The positions *d*1, *d*2, *d*3, . . . *dn* are the positions along the medium midway between the corresponding two points A and B and assumed hereinafter to lie at the zero field point therebetween. When the current in conductor 19 is removed, the domain wall escapes from position *d*1 under the influence of the D.C. field H*dc*. The current is then reapplied to again generate the field described in connection with FIGS. 2 and 3. The domain wall moves to position *d*2 where it is again stopped by that field. In this manner, the domain wall is permitted to move along the wire 11 from position to position by the removal of current from conductor 19. For this purpose, conductor 19 is advantageously of small diameter, for example 0.0008 inch, to avoid generating uniform fields thereabout. After the current is removed from conductor 19 *n* times, the wall escapes from position *dn* to induce a pulse in sense conductor 17. Subsequently, the flux in the material is realigned in the forward direction by a reset pulse conviently applied by reversing the polarity of current in the bias conductor 12. Thereafter the operation may be repeated.

Figure 4:
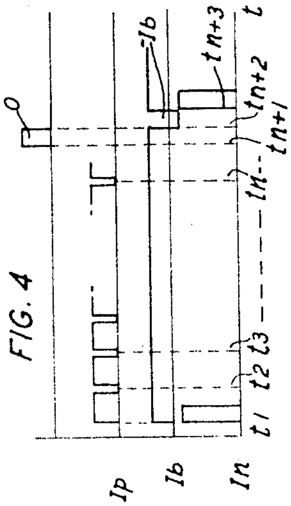
FIG. 4 is a pulse diagram showing the pulses applied during the operation of the device shown in FIG. 1.

The operation of the device of FIG. 1 as summarized in connection with the pulse diagram of FIG. 4. At an arbitrary time *t*1, the nucleation current I*n*, the bias current I*b*, and the pulse current I*p* are provided. At a time *t*2, illustratively longer than the time required for the domain wall to reach position *d*1 under the influence of the bias field H*dc*, the pulse current I*p* is removed to permit the domain wall to pass position *d*1. Similarly, the pulse current I*p* is removed at times *t*3 . . . *tn* to permit the domain wall to pass the corresponding positions along the wire. At a time *tn*+1 an output pulse 0 is induced in sense conductor 17 of FIG. 1. At an arbitrary later time *tn*+2, a bias current —I*b* is applied to reset flux in the wire to the forward direction. Subsequently, at a time *tn*+3 a second nucleation pulse may be applied.

In the description of the operation of the device of FIG. 1, it is seen that a domain wall nucleated at the left end of wire 11, as viewed in FIG. 1, and moving at a nonuniform rate in the direction of the sense conductor 17, encounters the aforedescribed fields at the noted positions if a current flows in conductor 19 when the domain wall is at one of those positions. The result is that a domain wall moves through the medium at a rate determined by the number of times the current applied to conductor 19 is pulsed off. Consequently, the domain wall motion is digitalized by an implementation which may be thought of as a ratchet escapement mechanism. That is to say, a domain wall propagates to successive positions along the wire under the influence of a D.C. (bias) field only when the removal of the "pulse" field permits. The device serves admirably, for example, as a counter and as a timer. In addition, by coupling the sense conductor 17 along the magnetic wire at least about the central portion thereof, voltages having amplitudes and polarities indicative of the position of the domain wall in the wire are provided in response to signals rotating flux therein between easy and hard directions. Accordingly, a simple adaptive impedance element is realized.

In an alternative embodiment, current I*p* in conductor 19 rather than being pulsed off to permit the domain wall to escape from one of the ratchet positions may, in contradistinction, be normally off and pulsed on at times when the domain wall is in the vicinity of any one of the ratchet positions. Acknowledging that the position of the domain wall under the influence of the bias field is inexact, we can, nevertheless, indicate the limits within which the wall may lie after the bias field has been applied for a designated time. FIGS. 2 and 5 show a domain wall D short of position *d*1 and past position *d*1, respectively. These two positions may be taken as the limits within which the domain wall is positioned at a designated time. As in the previous embodiment, the domain wall is shown in FIG. 2 is accelerated to position *d*1 by the pulse field H*p*. In accordance with this embodiment, however, domain wall D, as shown in FIG. 5, may pass position *d*1 but is urged backward to that position under the influence of the pulse field. This is clear from FIG. 3 which shows the field to the right of position *d*1 dropping to a negative value greater than that required for wall motion to the left as viewed in the figure. Operation is entirely analogous to that already described.

For shift register applications it may be advantageous to move an entire reverse domain or a plurality of reverse domains through a suitable medium. In such an instance, the ratchet escapement mechanism may be implemented for each domain wall bounding a reverse domain. As has been mentioned hereinbefore, the two domain walls bounding a reverse domain propagate in opposite directions in response to a bias field of a given polarity as is well known. Accordingly, for propagating those domain walls, in accordance with this invention, those walls are simultaneously exposed to bias fields of opposite polarity and "unlatched" at successive positions of the magnetic wire by a built-in mechanism responsive to changes in polarity of the bias applied. The arrangement permits the propagation of a reverse domain and the associated domain walls along a magnetic wire in response to an alternating bias applied to a single conductor.

Figure 6:
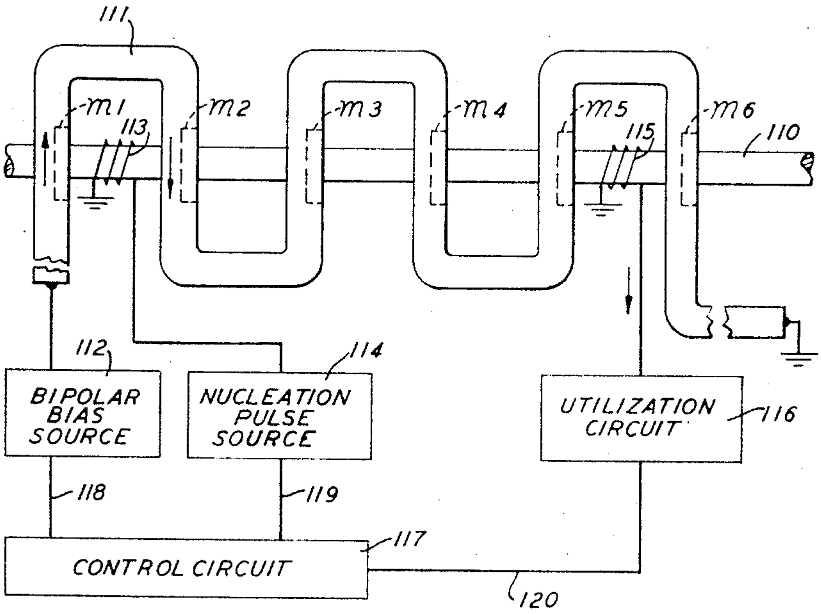
FIG. 6 is a schematic illustration of another device in accordance with this invention.

FIG. 6 shows such an embodiment, in accordance with this invention, wherein a reverse domain is propagated along a magnetic wire 110. The magnetic wire is shown crisscrossed by a bias solenoid 111 which is connected between a bipolar bias source 112 and ground. Importantly, conductive members *m*1, . . . *m*6 are associated with successive sections of solenoid 111 where those sections couple the wire 110. A nucleation conductor 113 couples a portion of wire 110 (shown limited for clarity) between successive sections of solenoid 111 and is connected between a nucleation pulse source 114 and ground. A utilization conductor 115, connected between a utilization circuit 116 and ground, couples wire 110 at a position remote from that coupled by nucleation conductor 113. A control circuit 117 is connected to sources 112 and 114 and utilization circuit 116 by conductors 118, 119, and 120, respectively. The various sources and circuits are any such elements capable of operating in accordance with this invention.

Operation of the circuit of FIG. 6 is now described for for the propagation of a single illustrative reverse domain and the domain walls associated therewith. The storage and retrieval of information in the form of reverse domains is entirely analogous to such operations in well known domain wall devices and will be discussed only briefly.

Specifically, a positive current is applied to nucleation conductor 113 by nucleation pulse source 114 under the control of control circuit 117. The current generates a field in excess of a characteristic nucleation threshold to provide a reverse domain in the coupled portion of wire 110. The domain is represented by an arrow, directed to the right in FIG. 7, bounded by vertical lines which represent the domain walls. Bipolar bias pulses are applied to solenoid 111 by bipolar bias source 112 again under the control of control circuit 117. The fields generated by these pulses are in excess of a characteristic propagation threshold but less than the nucleation threshold of the magnetic material of wire 110. In response to the alternating bias field, the reverse domain moves incrementally along the wire 110 passing through the portion coupled by the sense conductor 115, inducing a pulse therein as each domain wall passes the sense conductor just following an alternation of the bias current. Since pulses are induced in the sense conductor just following bias alternations, the output from shift registers in accordance with this invention is digitalized regardless of nonuniform characteristics of the wire and stray magnetic fields.

Figure 9:
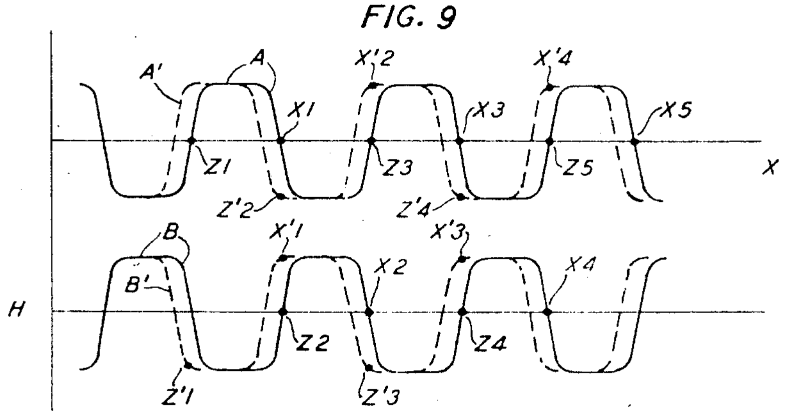
FIG. 9 is a graph showing the fields generated in the device of FIG. 6 during operation thereof.
Figure 10:
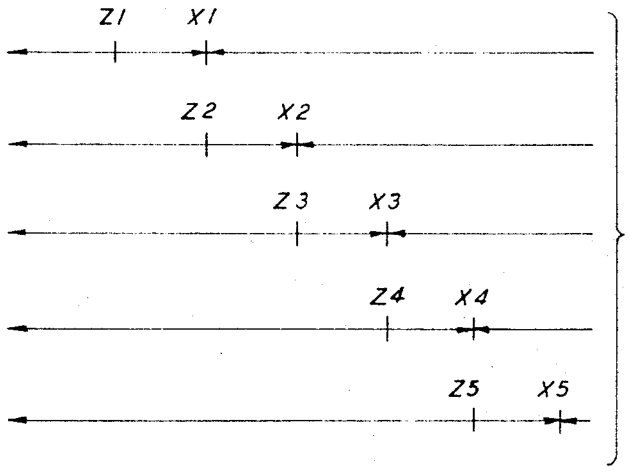
FIG. 10 is a diagram showing the progress of a reverse domain through the device of FIG. 6 during operation thereof.
Figure 7:
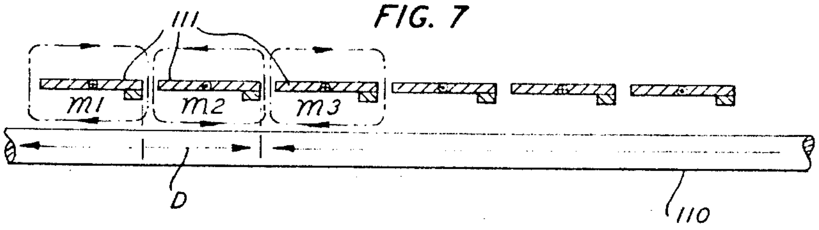
FIGS. 7 and 8 are schematic illustrations of portions of the device or FIG. 6, partially in cross section.
Figure 8:
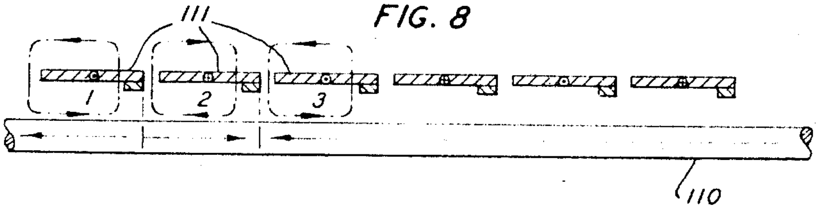

The unexpected movement of two adjacent domain walls in a like direction in response to a bias signal applied to a single wire is basic to this aspect of this invention and an understanding of the responsible mechanism is helpful. That mechanism is explained in connection with FIGS. 7 through 10. FIG. 7 shows wire 110 with the bias solenoid 111 and conductive members *m* in cross section taken along the axis of wire 110. A positive current in solenoid 111 is indicated by the arrows in the representation of solenoid 111 as shown in FIG. 6 and the corresponding encircled plus signs and dots in the cross section representation of that solenoid in FIG. 7. That positive current generates a clockwise field about the first portion of solenoid 111 as shown in FIG. 7 by the broken curved arrows. For simplicity, the portions of solenoid 111 shown in cross section are referred to in increasing order from left to right as viewed in FIG. 7. The second portion of solenoid 111 has generated thereabout a counterclockwise field and the third portion has a clockwise field thereabout. In wire 110 between portions thereof coupled by successive portions of the bias conductor 111, the field is zero. This field distribution and the zero points therein are shown as curve A in FIG. 9 as a function of distance *x* along wire 110. It may be appreciated that a reverse domain of the polarity indicated by the arrow D in FIG. 7 is bounded by domain walls which rest at adjacent zero points. The positions of those adjacent walls are designated Z1 and X1 in FIG. 9. The position of the domain walls and the reverse domain therebetween are shown in FIG. 10 also as two vertical lines with an arrow directed to the right therebetween. Successive lines in FIG. 10 record the progress of the reverse domain as the bias alternates.

A binary one is considered stored as a reverse domain between domain walls located, illustratively, at points Z1 and X1 (in wire 110, FIG. 6). The polarity of the bias current is now reversed. Due to conductive members *m* and eddy currents generated therein in response to the bias alternation, changes in the field in the magnetic wire there are opposed. The flux reversals due to the alternations are shown as broken curved arrows for the first three portions of solenoid 111 in FIG. 8. The field patterns beneath members *m* as viewed in the figure are omitted. The actual transient configuration of the field, however, is represented by the broken curve B′ shown in FIG. 9. That is, due to eddy current effects, an alternation of the bias current produces a transient shifting, to the left, of the zero field point as well as a reversal of the bias field. Consequently, when the bias becomes negative, a domain wall at position X1 finds itself in a positive field represented by a point designated X′1 on curve B′. A positive field accelerates that wall to the right. Similarly, a wall at the zero (field) point designated Z1 finds itself in a negative field represented by a point designated Z′1 on curve B′. A negative potential accelerates the latter wall to the right also. Thus, adjacent walls defining a reverse domain are accelerated to the right along wire 110 until each arrives at a point at which the field is again zero. Those next zero field positions are designated Z2 and X2 on curve B for the left and right walls of the reverse domain, as viewed, respectively. The next alternation of bias current from negative to positive polarity results, similarly, in a transient field configuration represented by broken curve A′ in FIG. 9. Accordingly, domain walls at positions Z2 and X2 find themselves in negative and positive fields represented as points designated Z′2 and X′2 on curve *a*′. Again, the fields are of the proper polarities to move both domain walls to the right until the next zero (field) points are encountered. These next zero points are designtaed Z3 and X3 on curve *a*. It is to be noted that, illustratively, the transient field distributions due to eddy current effects and represented by broken curves A′ and B′ decay to the appropriate steady state configurations represented by solid curves A and B of FIG. 10 before the domain walls traverse the distance between zero points. It may also be appreciated from a glance at FIGS. 7 and 9 that no propagation results in the absence of members *m*, because the zero points do not move in response to the bias alternations in that case. After the walls pass the sense conductor, they may be propagated off the end of wire 110 or the reverse domain may be collapsed by well known means.

The foregoing description explains the propagation of an illustrative single reverse domain representing a binary one through a shift register in accordance with this invention. Other reverse domains stored sequentially or in parallel with the illustrative reverse domain are propagated in an entirely analogous manner. Typically, adjacent bits are stored one location apart. Specifically, parallel storage results in the presence (binary one) or absence (binary zero) of reverse domains at positions Z1–X1; Z3–X3, Z5–X5, . . . et cetera. Alternatively, sequential storage operation permits the nucleation of reverse domains at position Z1–X1 between every other alternation of the bias. In accordance with this invention, all domain walls are advanced on each alternation of the bias current to the next zero field point. The "unlatching" of the walls for movement is provided by eddy current effects in response to each bias alternation.

A suitable material for wire 110 in accordance with this invention is niobium permalloy as disclosed in copending application Ser. No. 405,692, filed Oct. 22, 1964, for D. H. Smith and E. M. Tolman, now Patent No. 3,350,199. The devices are operated in the kilocycle range. Reverse domains are less than 100 mils (.100 inch) apart, adjacent bits, accordingly, being spaced apart also less than 100 mils. Solenoid 111 and members *m*, typically 300 mils wide spaced 30 mils apart, and 150 mils wide, respectively, are conveniently copper, etched from copper-clad Mylar sheets, for example, by well known photoresist techniques. Eddy currents persist for about .500 microsecond at the contemplated operating speeds, decaying within the time taken by a domain wall to traverse the portions of wire 110 from one zero point to the next. Actually, the eddy current effects need not decay by the time a domain wall reaches the next zero point. The effect may persist until the next bias alternation which is arbitrarily determined by control circuit 117 as shown.

What has been described is considered to be only illustrative of this invention. Accordingly, various and numerous other arrangements may be devised by one skilled in the art without departing from the spirit and scope of this invention.

What is claimed is:

1. A domain wall device including a magnetic medium comprising means for propagating along said medium a stable condition comprising a domain wall, said propagating means including means for providing a substantially uniform bias field along said medium for propagating domain walls and means for normally providing spatially spaced apart zero field points therein for inhibiting the propagation of domain walls, and means for controllably eliminating said zero field points for a time to permit said substantially uniform bias field to propagate said domain walls thereby.

2. In combination, an elongated medium comprising magnetic material characterized by the ability to maintain a stable condition comprising a domain wall therein in response to a first field in excess of a nucleation threshold and the ability to move said stable condition therealong in response to a second field in excess of a characteristic propagation threshold but less than said nucleation threshold, nucleation means coupled to a first portion of said medium for providing said first field there, sense means coupled to a second portion of said medium spaced apart from said first portion for providing indications of the arrival thereat of said stable condition, and digital means for controlling the transit time of said stable condition from said first to said second portion, said digital means comprising bias means for generating a uniform said second field in the portion of said medium intermediate said first and second portions, means for reducing said second field at prescribed spaced apart positions in the intermediate portion to below said propagation threshold, said last-mentioned means comprising a conductor including loops therein such that each of said loops couples one of said positions in a manner to generate opposing fields in adjacent portions of said medium at said position in response to currents flowing therein, and means connected to said conductor for applying current pulses thereto.

3. A combination in accordance with claim 2 wherein said last-mentioned means comprises a small diameter conductor for generating nonuniform opposing fields in adjacent portions of said medium.

4. A domain wall shift register comprising means for propagating a reverse domain therealong, said propagating means including first means for providing a bias magnetic field having opposite polarities in succeeding portions of said shift register defining spatially spaced apart zero field points therebetween, and bipolar means connected to said first means for reversing the polarities of said field, and means responsive to the reversing of said polarities for controllably displacing said zero field points in said shift register.

5. In combination, an elongated medium comprising magnetic material characterized by the ability to maintain a reverse domain therein in response to a first field in excess of a characteristic nucleation threshold and the ability to propagate said reverse domain therealong in response to a second field in excess of a characteristic propagation threshold but less than said nucleation threshold, means coupled to a first portion of said medium for providing said first field there, sense means coupled to a second portion of said medium spaced apart from said first portion for providing indications of the arrival thereat of said reverse domain, and digital means for controlling the transit time of said reverse domain from said first to said second portion, said digital means comprising first means for inducing a plurality of substantially uniform successively opposing second fields in adjacent portions of said medium intermediate said first and second portions defining a plurality of positions where said second field is normally zero, eddy current means including a conductive strip at each of said positions for providing a transient shift in the positions where said propagation fields are normally zero in response to a change in the polarities of said opposing second fields, and means for so changing said polarities.

6. A combination in accordance with claim 5 wherein said first means comprises a solenoid crisscrossing said medium wherein the width of said solenoid is much greater than the spacings between successive sections thereof.

7. A combination in accordance with claim 6 wherein said eddy current means comprises a separate conductive member coupled to said medium at each position where the field is normally zero.

8. In combination, an elongated medium comprising magnetic material characterized by the ability to maintain a stable condition comprising a domain wall therein in response to a first field in excess of a characteristic nucleation threshold and the ability to move said stable condition therealong in response to a second field in excess of a characteristic propagation threshold but less than said nucleation threshold, nucleation means coupled to a first portion of said medium for providing said first field therein, sense means coupled to a second portion of said medium spaced apart from said first portion for providing indications of the arrival thereat of said stable condition, and digital means for controlling the transit time of said first stable condition from said first to said second portion, said digital means comprising bias means for generating a uniform said second field in the portion of said medium intermediate said first and second portions, and conductive means for providing a plurality of adjacent opposing fields at spaced apart positions in said intermediate portion at times when said first stable condition is in the vicinity of one said positions under the influence of said second field.

(References on following page)

References Cited

UNITED STATES PATENTS

| | | | |
|---|---|---|---|
| 3,114,898 | 12/1963 | Fuller. | |
| 3,148,360 | 9/1964 | Hale. | |
| 3,248,716 | 4/1966 | Snyder. | |
| 3,295,114 | 12/1966 | Snyder. | |
| 3,316,543 | 4/1967 | Tickle. | |
| 3,351,922 | 11/1967 | Snyder | 340—174 |
| 3,394,358 | 6/1968 | Snyder | 340—174 |

STANLEY M. URYNOWICZ, Primary Examiner